(12) United States Patent
Grenier et al.

(10) Patent No.: US 11,752,618 B2
(45) Date of Patent: Sep. 12, 2023

(54) COMPACT DEVICE DESIGNED TO BE POSITIONED CLOSE TO A JOINT AND GENERAL SYSTEM COMPRISING SUCH A COMPACT DEVICE

(71) Applicant: SAFRAN ELECTRONICS & DEFENSE, Paris (FR)

(72) Inventors: Jordane Grenier, Moissy-Cramayel (FR); Pascal Larose, Sherbrooke (CA)

(73) Assignees: SAFRAN ELECTRONICS & DEFENSE, Paris (FR); EXONETIK INC., Sherbrooke (CA)

( * ) Notice: Subject to any disclaimer, the term of this patent is extended or adjusted under 35 U.S.C. 154(b) by 0 days.

(21) Appl. No.: 17/597,217

(22) PCT Filed: Jul. 2, 2020

(86) PCT No.: PCT/EP2020/068717
§ 371 (c)(1),
(2) Date: Dec. 29, 2021

(87) PCT Pub. No.: WO2021/001497
PCT Pub. Date: Jan. 7, 2021

(65) Prior Publication Data
US 2022/0234191 A1    Jul. 28, 2022

(30) Foreign Application Priority Data

Jul. 2, 2019 (FR) ...................................... 1907331

(51) Int. Cl.
*B25J 9/00*    (2006.01)
*A61H 1/02*    (2006.01)

(52) U.S. Cl.
CPC .......... *B25J 9/0006* (2013.01); *A61H 1/0266* (2013.01); *A61H 2201/1246* (2013.01)

(58) Field of Classification Search
CPC .... A61H 1/024; A61H 1/0266; A61H 1/0277; A61H 2201/1246; A61H 2201/1238; A61H 3/00; B25J 9/0006
See application file for complete search history.

(56) References Cited

U.S. PATENT DOCUMENTS 9,532,877 B2 * 1/2017 Holgate ................ A61F 2/3094
10,682,277 B2 * 6/2020 Gayral ................... A61H 1/024

FOREIGN PATENT DOCUMENTS

CN  107802455 A  3/2018
CN  108189008 A  6/2018
(Continued)

*Primary Examiner* — Brian A Dukert
(74) *Attorney, Agent, or Firm* — Muncy, Geissler, Olds & Lowe, P.C.

(57) ABSTRACT

A device intended to be positioned close to a joint between two parts, the device including a first interface carried by a first of the two parts and a second interface carried by a second of the two parts, the device including at least one connection between the first interface and the second interface. The connection includes two cylinders mounted in parallel so that each cylinder is connected by its output rod to the first interface and by its body to the second interface, the simultaneous displacement of the two output rods allowing, when in use, movement of the second part of the joint relative to the first part of the joint. A general system including the device as well as a fluid-supply unit for said device are also provided.

12 Claims, 3 Drawing Sheets

(56) References Cited

FOREIGN PATENT DOCUMENTS

| CN | 208799474 U | 4/2019 |
|---|---|---|
| FR | 3004105 A3 | 10/2014 |
| WO | WO-2018218336 A1 | 12/2018 |

\* cited by examiner

COMPACT DEVICE DESIGNED TO BE POSITIONED CLOSE TO A JOINT AND GENERAL SYSTEM COMPRISING SUCH A COMPACT DEVICE

The invention relates to a compact device intended to be positioned close to a joint.

The invention also relates to a general system comprising such a compact device.

BACKGROUND OF THE INVENTION

An assistive exoskeleton increases a person's physical capabilities by making it easier for that person to perform certain tasks. Exoskeletons can thus be used in many applications, whether military, medical, industrial, etc., and for rehabilitation, palliation, assistance, etc.

However, it is relatively complex to create an exoskeleton that can follow the natural movements of the user, especially for complex joints such as the ankle or knee. The exoskeleton must therefore be able to operate the joint synchronously with the user's movements in order to be able to assist the user effectively.

In an attempt to fulfil this function, current exoskeletons tend to be very bulky, which is not very ergonomic for the user and causes additional energy costs for the user.

PURPOSE OF THE INVENTION

One purpose of the invention is to provide a device that allows efficient actuation of a joint while being relatively small in size at the target joint.

It is also an aim of the invention to provide a general system comprising such a device.

SUMMARY OF THE INVENTION

In furtherance of this aim, the invention provides a device intended to be positioned close to a joint between two parts, the device comprising a first interface carried by a first of the two parts and a second interface carried by a second of the two parts, the device comprising at least one connection between the first interface and the second interface.

According to the invention, the connection comprises two cylinders mounted in parallel so that each cylinder is connected by its output rod to the first interface and by its body to the second interface, the simultaneous displacement of the two output rods allowing, when in use, movement of the second part of the joint relative to the first part of the joint.

Thus, by using two cylinders in parallel, it is possible to develop enough torque to relieve a user while having a relatively compact device.

The invention therefore allows the two parts of the joint to be moved relative to each other in a simple and effective manner while being centred on the joint.

In a particular embodiment, one of the output rods is mounted directly on the second interface.

In a particular embodiment, the output rod is articulated onto the second interface.

In a particular embodiment, the device comprises at least one secondary connection limiting a risk of undesired sliding of the first interface along the associated part.

In a particular embodiment, the secondary connection comprises an arm attached at at least one end to at least one of the interfaces.

In a particular embodiment, the arm is attached at one end to the first interface and is articulated, at its second end, onto the second interface.

In a particular embodiment, the device comprises a supply-line arranged between the two cylinder bodies ensuring communication between the two cylinder chambers.

In a particular embodiment, the supply-line globally has the shape of a U.

In a particular embodiment, the device comprises a sensor arranged in the space bounded by the U of the supply-line.

In a particular embodiment, the device is shaped to be positioned, when in use, close to an ankle of a user, with the first interface being positioned on a leg of the user and the second interface on the foot of the user.

In a particular embodiment, the second interface is shaped to be in contact the sole of a user's shoe.

In a particular embodiment, the connection comprises only two cylinders.

In a particular embodiment, the device comprises only one connection.

In a particular embodiment, only two cylinders connect the two interfaces.

In a particular embodiment, the cylinders of the connection cannot work independently.

In a particular embodiment, the cylinders of the device cannot work independently.

The invention also relates to a general system comprising such a device as well as a fluid-supply unit for said device.

In particular, the supply unit comprises at least one magneto-rheological fluid clutch.

Further features and advantages of the invention will become apparent from the following description of a particular non-limiting embodiment of the invention.

BRIEF DESCRIPTION OF THE DRAWINGS

The invention will be better understood in the light of the following description with reference to the attached schematic figures, of which.

DETAILED DESCRIPTION OF THE INVENTION

Figure 1:
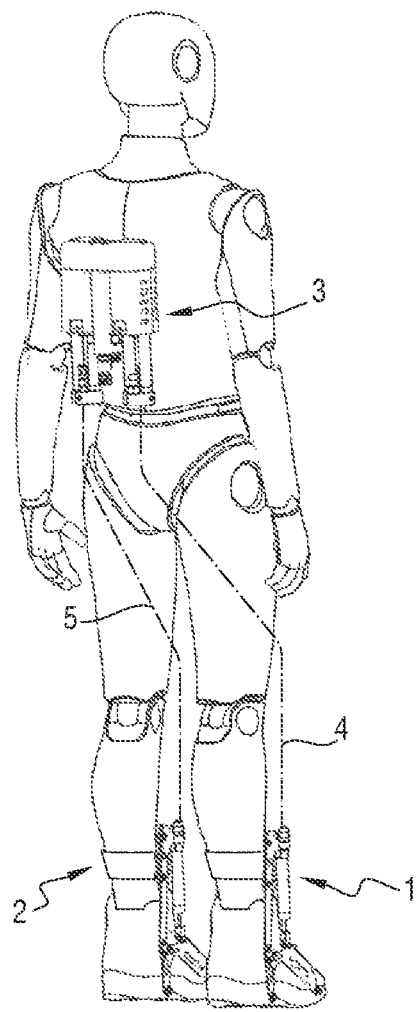
FIG. 1 is a schematic perspective view of a general system worn by a user and comprising at least one device in a particular embodiment of the invention which is positioned close to a joint of the said user.

With reference to FIG. 1, in a particular embodiment of the invention, the general system comprises a first device 1 associated with a user's right ankle and a second device 2 associated with the user's left ankle, and a fluid-supply unit 3 for the first device 1 and the second device 2. The fluid is preferably a liquid such as oil or water.

The system thus comprises a first channel 4 for connecting the supply unit 3 to the first device 1 and a second connection channel 5 the supply unit 3 to the second device 2, both channels 4, 5 being also carried by the user. The supply unit 3 is furthermore arranged at the user's lower back, for example by means of a strap or straps, a backpack, a belt, an elastic band or bands, etc. For further information on the supply unit 3, reference may preferably be made to the supply unit described in international application PCT/CA2018/050570 filed on 14 May 2018 and incorporated herein by reference.

Figure 2:
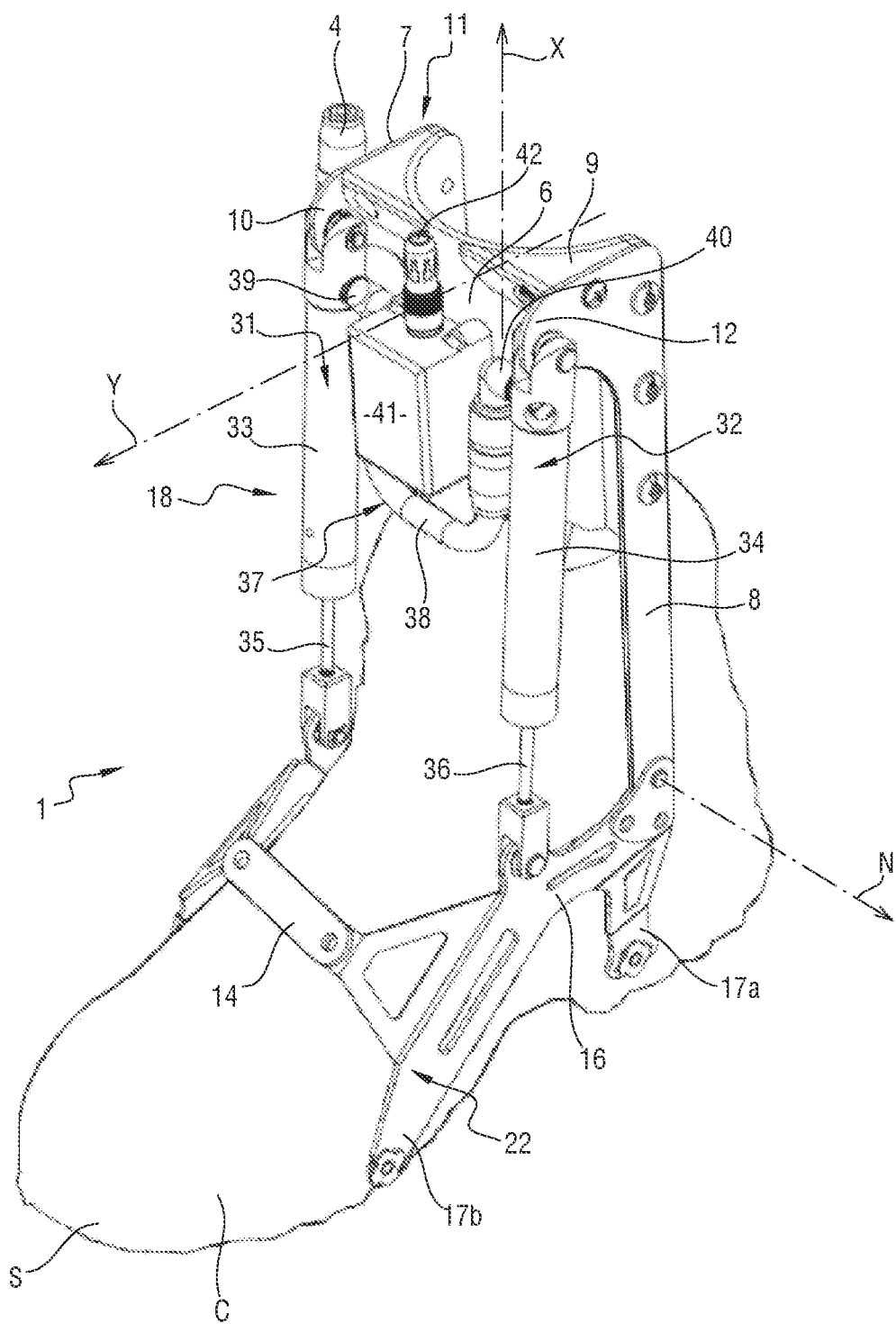
FIG. 2 is an enlarged perspective view of the device shown in FIG. 1, worn by the user.

The first device 1 will now be described with reference to FIGS. 2 to 4. Since the second device 2 is identical to the first device 1, the following description is also applicable to the second device 2.

The device 1 comprises a first interface 11 which is arranged on the user's leg (the leg here being the part of the human body extending between the knee and the ankle). For example, straps (not shown here) or any other means of attachment are used to secure the first interface 11 to the leg. The first interface 11 is preferably arranged on the front of the user's leg at the level of the shin. In this way, the first interface 11 overhangs the user's foot.

Advantageously, the first interface 11 is arranged in the lower part of the leg substantially at the level of the ankle, the device thus being of reduced size. Specifically here, the first interface 11 does not extend beyond the middle of the leg and preferably does not extend beyond the lower third of the leg.

Preferably, the first interface 11 is shaped so that the attachment means (in this case straps) are positioned under the belly of the gastrocnemius muscle. This limits muscle compression and ischaemia of the muscle. This also results in a first interface 11 of limited height and consequently a compact device 1.

The first interface 11 is advantageously shaped to match the front shape of the leg. For this purpose, the first interface 11 comprises a shell 6 whose surface intended to be in contact with the user is concave, with a concavity similar to that of the user's tibia.

The shell 6 is generally shaped like a rectangular parallelepiped with a hollow on its main face intended to be in contact with the user to form the aforementioned concave surface.

Furthermore, the first interface 1 comprises two side arms, right 7 and left 8, arranged respectively on the right and left side of the shell 6. Typically, the two side arms 7, 8 are rigidly attached to the right and left sides of the shell 6. The side arms 7, 8 thus extend from the top face 9 of the shell (a top face of each side arm 7, 8 thus being flush with said top face 9) to substantially a second interface 22 of the device 1. Each side arm 7, 8 is extended by a lug 10, 12 extending from the upper end of each arm towards the front of the foot, the two lugs 10, 12 thus projecting from the shell 6.

In a particular embodiment, the device 1 is arranged so that the two side arms 7, 8 extend along a first substantially vertical axis X. Preferably, the two lugs 10, 12 extend along a second axis Y perpendicular to the first axis X. The two lugs 10, 12 thus extend substantially horizontally.

The said second interface 22 is arranged on the user's foot. Specifically, the second interface 22 is arranged on the top and sides of the user's foot.

The second interface 22 comprises for example a plate 13 itself comprising a central portion 14 extending over the top of the foot extended at each of its ends by two lateral extensions, right 15 and left 16 extending respectively over the right and left sides of the foot.

From the plate 13 there are four arms for attachment to the user's shoe C. In a particular embodiment, two first attachment arms 17a extend from one of the free ends of the right and left side extensions 15 and 16 respectively to the shoe C and two second attachment arms 17b extend from the junction between the central portion 14 and one of the side extensions 15, 16 respectively. The first attachment arms 17a extend substantially obliquely towards the rear of the foot. The second attachment arms 17b extend substantially obliquely towards the front of the foot.

The second attachment arms 17a are thus arranged substantially in front of and to the sides of the instep so as to extend offset from the natural flexural joint axis of the user's ankle N. The first attachment arms 17a are for example, but not limited to, arranged along the foot so that their centres of attachment to the plate 13 are substantially centred on the natural flexural joint axis of the user's ankle N, the first attachment arms 17a then extending backwards with respect to this natural flexural joint axis of the ankle N.

In this case, the device 1 is arranged so that the natural bending joint axis of the ankle N is orthogonal to the X and Y axes.

Preferably the attachment arms 17a, 17b are sized to allow attachment of the second interface 22 to the sole S of said shoe C. The attachment arms 17a, 17b may extend so as to be in contact with the ground or may extend to the sole S only, which sole S is itself in contact with the ground.

Preferably the attachment arms 17a, 17b are symmetrically distributed between the two sides of the shoe C.

This ensures that the forces exerted by the second interface 22 on the shoe C during a relative movement between the two interfaces 11, 22 are well distributed.

Note that both interfaces 11, 22 are rigid here.

Furthermore, the device 1 has a main connection 18 from the first interface 11 to the second interface 22.

For this purpose, the main connection 18 comprises a set of two cylinders 31, 32 connected in parallel between the two interfaces 11, 22.

Each cylinder 31, 32 extends here substantially longitudinally parallel to a same axis V. The device 1 is arranged so that said axis V is oblique to the first axis X. The cylinders 31, 32 thus extend at an angle and not vertically.

In a preferred embodiment, a first cylinder 31 is associated with a right side of the foot and a second cylinder 32 is associated with a left side of the foot. The two cylinders 31, 32 are thus arranged symmetrically in relation to the ankle, which makes it possible to better distribute the forces exerted by the device 1 on and around the user. More specifically, the two cylinders 31, 32 are arranged slightly in front of the instep and slightly on the right and left sides of the instep.

The cylinders 31, 32 thus form a pair of side cylinders. However, it is noted that the two cylinders 31, 32 are distinct and form two different entities.

The cylinders 31, 32 are identical here.

In this case, the body of the first cylinder 31 and the body of the second cylinder 32 are connected to the first interface 11.

The body of the first cylinder 31 and the body of the second cylinder 32 are directly mounted on the first interface 11 on a right side and a left side of the first interface 11, respectively. The body of the first cylinder 31 and the body of the second cylinder 32 are, for example, articulated onto the first interface 11.

Typically, each cylinder body 31, 32 is articulated onto the first interface 11 by a ball-and-socket connection or by a pivot connection. The cylinder bodies 31, 32 can therefore be rotated relative to the first interface 11.

Typically the upper end of the body 33 of the first cylinder 31 and the upper end of the body 34 of the second cylinder 32 are each articulated onto the upper end of the first interface 11.

More precisely, the upper end of the body 33 of the first cylinder 31 and the upper end of the body 34 of the second cylinder 32 are each articulated onto the right-hand lug 10 and the left-hand lug 12 respectively.

Furthermore, each output rod 35, 36 of the cylinders 31, 32 is translatable in the associated body 33, 34 along an axis parallel to the V-axis between a retracted position (shown in FIG. 4) in which the output rods 35, 36 are raised towards the user's knee and an extended position (shown in FIG. 3) in which the output rods 35, 36 are lowered towards the user's ankle.

Thus, the cylinders 31, 32 are simple structural cylinders.

The movement of the output rods 35, 36 in the respective bodies 33, 34 is ensured by the supply of fluid to the cylinders 31, 32 by the supply unit 3.

For this purpose, the connection channel 4 opens into a first of the two cylinders at the upper end of the respective cylinder body.

The cylinder into which the connection channel 4 opens is preferably the outer cylinder, i.e. the left cylinder for the left leg and the right cylinder for the right leg.

The device 1 also comprises a secondary supply-line 37 opening at a first end into the first body 33 and at a second end into the second body 34. The fluid from the connection channel 4 can thus flow between the two chambers in the two bodies 33, 34 via the secondary supply-line 37 to allow the two output rods 35, 36 to extend or retract. This deployment or retraction is simultaneous or quasi-simultaneous due to the short length of the secondary supply-line 37.

The two cylinders 31, 32 thus operate in parallel, which makes it possible to develop a significant torque between the interfaces 11 and 22 while having a compact device 1, the stroke of the cylinders 31, 32 being limited by the simple structure of the cylinders 31, 32.

The secondary supply-line 37 is here shaped as a central U-shaped portion 38 extended at its two ends by two straight connecting sections 39, 40. The two sections 39, 40 open into the upper part of the associated body (33, 34 respectively). The central portion extends between the two sections 39, 40 towards the second interface 22.

The secondary supply-line 37 is furthermore arranged so that the two sections 39, 40 extend substantially horizontally. The secondary supply-line 37 is further arranged so that the central part of the central portion 38 extends substantially parallel to the two sections 39, 40 and thus substantially horizontally. The two branches of the U-shaped portion also extend parallel to the first axis X, i.e. substantially vertically.

According to a preferred embodiment, the device 1 comprises at least one sensor 41 allowing, in particular, the device 1 to be managed and in particular its supply unit. The sensor 41 is typically an inertial unit comprising a main block equipped with a connector 42. Preferably, the main block is arranged in the space delimited by the central portion 38 of the secondary supply-line 37. The main block is thus arranged at the level of the bodies of the two cylinders 31, 32. The connector 42 extends from a top face of the main block so as to extend along the shell 6.

This results in a particularly compact device 1.

Furthermore, the output rod 35, 36 of each cylinder 31, 32 is directly mounted at its free end on the second interface 22 on a right and a left side of the second interface 22 respectively.

This allows the second interface 22 to be operated directly by the output rods 35, 36 without an intermediate operating mechanism.

Preferably also, the free end of the output rods 35, 36 is articulated onto the second interface 22.

This reduces the risk of damaging the free ends of the output rods 35, 36 when they press against the second interface 22. In addition, this allows the device 1 to follow the movements of the user's ankle more naturally.

Typically, the output rods 35, 36 are articulated onto the second interface 22, for example by a ball-and-socket joint or a pivot joint.

The free ends of the output rods 35, 36 are typically clevis shaped for pivotal mounting on the plate 13. The clevises each surround the associated plate portion 13.

The output rods 35, 36 are here mounted on the second interface 22 at the junction between the central portion 14 and the lateral extensions 15, 16 of the plate 13, substantially above the second arms 17.

The output rods 35, 36 accordingly act on the second interface 22 in a manner that is offset from the natural flexion joint axis of the user's ankle N. In particular, the output rods 35, 36 act via the plate 13 on the attachment arms 17a, 17b which themselves act on the ground or on the sole S.

Figure 3:
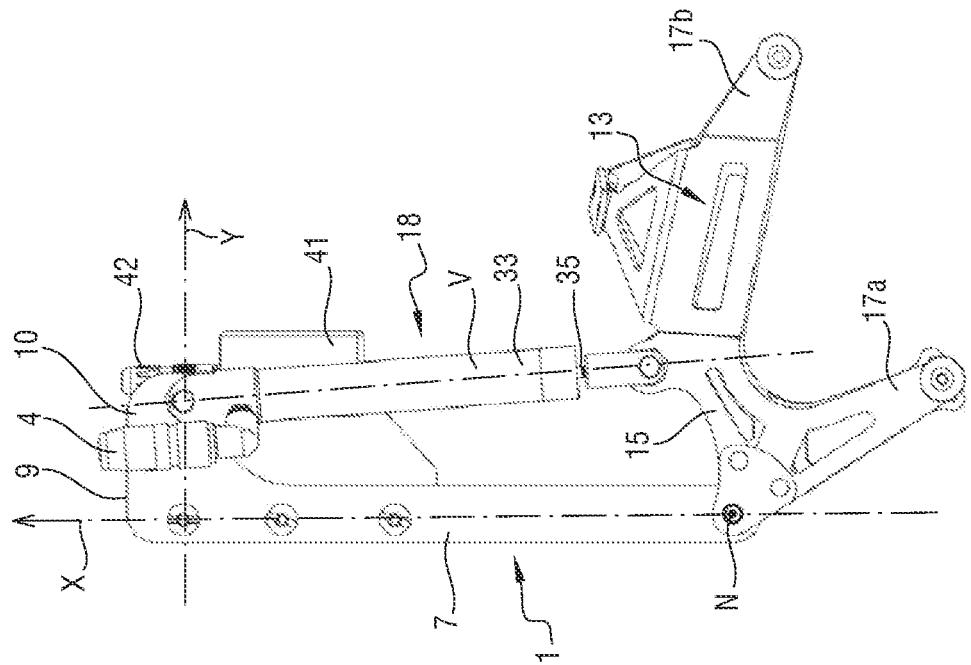
FIG. 3 is a side view of the single device shown in FIG. 2 with the cylinders in the extended position.
Figure 4:
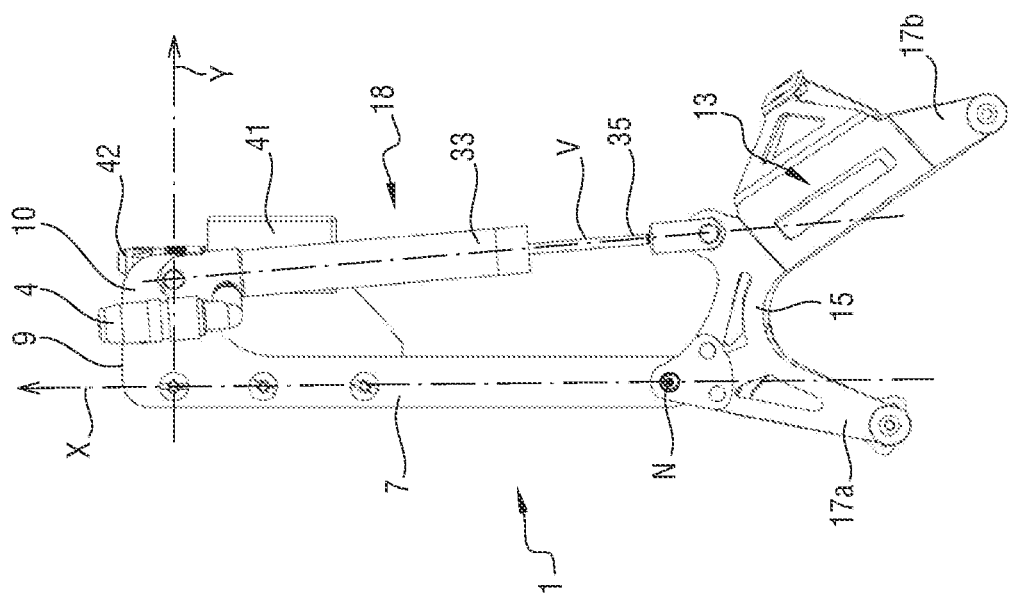
FIG. 4 is a similar view to FIG. 3, with the cylinders in the retracted position.

In operation, starting from a situation in which the cylinders 31, 32 are in the retracted position (shown in FIG. 4), when the supply unit 3 supplies fluid to the two cylinders 31, 32, this will cause the two cylinders 31, 32 to progressively move until they are in the extended position (shown in FIG. 3).

The output rods 35, 36 consequently progressively exert a pushing force on the second interface 22 causing the second interface 22 to rotate relative to the first interface 11 and thus rotating the ankle.

The device 1 can thus help the user to move around, whether for walking or running, and this for both civilian and military applications.

The device 1 thus described is relatively simple in construction and allows direct action on the second interface 22 via the output rods 35, 36.

This allows for an efficient and responsive device 1. In particular, the device 1 described does not require belt-and-pulley mechanisms which could be too elastic.

The device 1 is also robust.

In addition, the device 1 is particularly compact by remaining centred around the ankle. This also allows the device 1 to be worn by a large number of people, compared to a prior art device that sits high on the tibia, where there are problems with different tibia lengths or calf dimensions for each user.

In addition, the use of two cylinders 31, 32 arranged symmetrically on each side of the ankle makes it possible to better manage the forces exerted on the user, particularly in terms of torsion. This improves the stability of the device 1.

In particular, the device 1 is arranged so that when the cylinders 31, 32 are in a median position between the extended and retracted positions, the user's foot is substantially in a horizontal plane, allowing the user to navigate flexing and extending around this plane as they move.

According to a preferred embodiment, in order to prevent the first interface 11 from moving up the tibia by reaction when the output rods 35, 36 exert a push on the second interface 22, the device 1 comprises at least one secondary connection arranged here between the first interface 11 and the second interface 22 of the user.

Preferably, the device 1 has two secondary connections which are each arranged between the first interface 11 and the second interface 22. Each secondary connection is typically arranged on one of the right and left sides of the first interface 11 and outside the first interface 11 respectively.

The secondary connections are formed here by the two arms 7, 8 of the first interface 11. As already mentioned the arms 7, 8 are rigidly attached at a first end to the first interface 11 and are here mounted on the second interface 22.

The arms 7, 8 thus form rigid structures that allow the forces generated by the main connection 18 to be taken up and thus prevent parasitic displacements of the first interface 11, and in particular a rise of the first interface 11 along the user's tibia. The arms 7, 8 are articulated at their second end onto the second interface 22.

For example, each arm 7, 8 is arranged to be connected to a respective one of the free ends of the side extensions 15, 16 of the plate 13.

Each arm 7, 8 is also preferably arranged to be pivotally mounted on the second interface 22 substantially at the level of the natural bending axis of the ankle N.

This minimises any unwanted movement of the first interface 11 relative to the user, such as the sliding of the interface 11 along the user's shin.

Of course, the invention is not limited to the embodiment described and variants can be made without departing from the scope of the invention as defined by the claims.

Typically, although here the device is associated with a general system, the device may be autonomous. The device may thus have its own supply unit, which may be close to one or both interfaces, carried by one or both interfaces or arranged remotely from both interfaces.

Furthermore, although the device has been associated with an ankle here, the device could be associated with other joints such as a knee, a wrist, etc.

The device could be used in many applications and be or be part of for example an exoskeleton, an orthosis, a prosthesis, a portable system, a system integrated in a robot . . . .

Similarly, although here the device is worn by a human, the device could be worn by a robot.

One or both interfaces of a device could be directly integrated into a user's clothing or footwear instead of being attached to it as described. For example, the second interface could be an integral part of the user's shoe.

One or both cylinder bodies could be rigidly attached to the first interface and not articulated onto it. One or both cylinder bodies could be rigidly attached to the first interface and not articulated onto it. One or both rods might not be directly connected to the second interface.

The device could be arranged differently. For example, the device could be arranged so that the cylinders extend vertically.

The device could have a different number of connections between the two interfaces. The device could thus have only one connection.

If the device has secondary connections, these may be different from what has been indicated.

For example, in place of the arms, straight rods can be used, or rods can be articulated at one or both ends, for example by means of pivot connections or ball-and-socket connections. This will give the device greater flexibility. The links may, for example, be articulated at their first end onto the first interface and at their second end to the shoe. For example, in the case of a pair of links, each link could be arranged to be articulated onto a respective one of the lateral ends of the first interface and to be articulated onto a corresponding one of the outer lateral sides of the shoe. Each link could also be arranged to be articulated onto the shoe substantially at the level of the ankle's flexion bending axis. The different links thus form rigid structures that allow the forces generated by the main connection to be taken up and thus prevent parasitic displacements of the first interface, and in particular a rise of the first interface along the user's tibia.

In any case, the secondary connection(s) could be hinged or attached at its second end to the shoe sole or body rather than at the second interface as illustrated. A secondary connection will preferably be connected at at least one of its ends to at least one of the interfaces.

The secondary connection could include a cylinder in place of a rigid structure such as a rod or link, or straps or spring or elastic return devices.

The secondary connections could be worn by the first interface and/or the second interface and/or a garment or shoe of the user.

A secondary connection could thus be directly carried at either end by one of the two respective interfaces as illustrated here.

The cylinder or cylinders could return to their retracted position naturally (when the foot is fully resting on the ground) and/or in a controlled manner by sucking fluid out of the cylinder and/or by means of a return member such as a spring . . . . The supply unit unit may produce a torque to compensate for a force produced by a return member.

The device could comprise other elements than those indicated, such as one or more sensors for measuring the force exerted by the user's foot on the ground or the force exerted by the second interface on the shoe or the force exerted at the level of the support zone of the output rod on the second interface . . . the sensor or sensors may measure other parameters such as temperature, pressure, acceleration, position . . . .

Interfaces could take a different form from those described. For example, each interface could take the form of a sleeve. Other means than straps can be used to attach the interfaces to the user, such as elastic bands, hook and loop fasteners (such as the product marketed under the brand name Velcro) . . . .

In addition, the supply-line could have a shape other than than the one described, e.g. it may simply run straight between the two cylinders. The device might not have any supply-lines between the two cylinders, each cylinder being individually connected to the supply unit, for example.

Similarly, the supply unit associated with the device could be different from that specified. For example, the supply unit might not have a clutch between the motor and the main actuator, or a different clutch, for example one that is not a magneto-rheological fluid. The supply unit also might not have an output actuator, with the motor and/or clutch powering the device directly. The supply unit could also include one or more speed reducers. The number of elements in the supply unit unit could thus vary. For example, a different motor could be associated with each device or the same clutch could be associated with several devices.

All or part of the supply unit could be worn or be part of the device.

The system could have a different number of devices than described and for example only one device.

The invention claimed is:

1. A device intended to be positioned close to a joint between two parts, the device comprising:
   a first interface carried by a first of the two parts;
   a second interface carried by a second of the two parts;
   at least one connection between the first interface and the second interface, the at least one connection comprising two cylinders mounted in parallel so that each cylinder is connected by its body to the first interface and by its output rod to the second interface, simultaneous displacement of the two output rods allowing, when in use, movement of the second part of the joint relative to the first part of the joint; and a supply-line arranged between the two bodies of the cylinders ensuring communication between the two chambers of the cylinders, wherein the device is shaped to be positioned in use in a vicinity of a user's ankle, the first interface being positioned on the user's leg and the second interface on the user's foot, the first interface not extending beyond a middle of the user's leg.

2. The device according to claim 1, wherein at least one of the output rods is mounted directly on the second interface.

3. The device according to claim 2, wherein the output rod is articulated onto the second interface.

4. The device according to claim 1, comprising at least one secondary connection limiting a risk of unwanted sliding of the first interface along the first of the two parts.

5. The device according to claim 4, wherein the secondary connection comprises an arm attached at at least one of its ends to at least one of the interfaces.

6. The device according to claim 5, wherein the arm is attached at one of its ends to the first interface and is articulated, at its second end, onto the second interface.

7. The device according to claim 1, wherein the supply-line is generally U-shaped.

8. The device according to claim 7, comprising at least one sensor arranged in the space delimited by the U of the supply-line.

9. The device according to claim 1, wherein the second interface is shaped to be in contact with the sole of a user's shoe.

10. A system comprising the device according to claim 1 and a fluid-supply unit for said device.

11. The system according to claim 10, wherein the fluid-supply unit comprises at least one magneto-rheological fluid clutch.

12. A system comprising:
a device intended to be positioned close to a joint between two parts, the device comprising:
a first interface carried by a first of the two parts;
a second interface carried by a second of the two parts; and
at least one connection between the first interface and the second interface, the at least one connection comprising two cylinders mounted in parallel so that each cylinder is connected by its body to the first interface and by its output rod to the second interface, the simultaneous displacement of the two output rods allowing, when in use, movement of the second part of the joint relative to the first part of the joint, the device being shaped to be positioned in use in the vicinity of a user's ankle, the first interface being positioned on a user's leg and the second interface on the user's foot, the first interface not extending beyond the middle of the leg; and
a fluid-supply unit for said device.

* * * * *